United States Patent [19]
Endo

[11] 4,383,238
[45] May 10, 1983

[54] OBSTACLE DETECTOR FOR A VEHICLE

[75] Inventor: Hiroshi Endo, Yokosuka, Japan

[73] Assignee: Nissan Motor Company, Limited, Yokohama, Japan

[21] Appl. No.: 186,329

[22] Filed: Sep. 11, 1980

[30] Foreign Application Priority Data

Sep. 13, 1979 [JP] Japan ............................ 54-117593

[51] Int. Cl.³ ............................................. G01S 9/66
[52] U.S. Cl. ...................................... 340/32; 340/34
[58] Field of Search .............. 340/31 R, 31 A, 38 P, 340/32, 34; 356/5

[56] References Cited

U.S. PATENT DOCUMENTS

| | | | |
|---|---|---|---|
| 3,442,347 | 5/1969 | Hodgson et al. | 340/32 |
| 3,749,918 | 7/1973 | Jones | 340/34 |
| 3,922,629 | 11/1975 | Hayakawa | 340/32 |
| 3,972,021 | 7/1976 | Leitz et al. | 340/32 |
| 4,015,232 | 3/1977 | Sindle | 340/32 |

FOREIGN PATENT DOCUMENTS

| | | |
|---|---|---|
| 539741 | 9/1941 | United Kingdom . |
| 1288115 | 9/1972 | United Kingdom . |
| 1300299 | 12/1972 | United Kingdom . |
| 1394222 | 5/1975 | United Kingdom . |

*Primary Examiner*—Gerald L. Brigance
*Attorney, Agent, or Firm*—Lane, Aitken & Kananen

[57] ABSTRACT

A pulse signal generator produces a first pulse signal having a pulse width substantially equal to twice the travel time required for light to travel a braking distance. A light transmitter radiates a light beam signal representing the first pulse signal so as to cover a detection area in which the braking distance is contained. A photoreceptor receives the light signal reflected by an obstacle present in the detection area and converts the received light beam signal to a second corresponding electric pulse signal. A determination device determines whether the time width of a pulse of the first signal is larger than the time interval taken from the time when the corresponding pulse of the light signal is transmitted to the time when the pulse of the light signal is received by the receptor after reflection by the obstacle.

12 Claims, 21 Drawing Figures

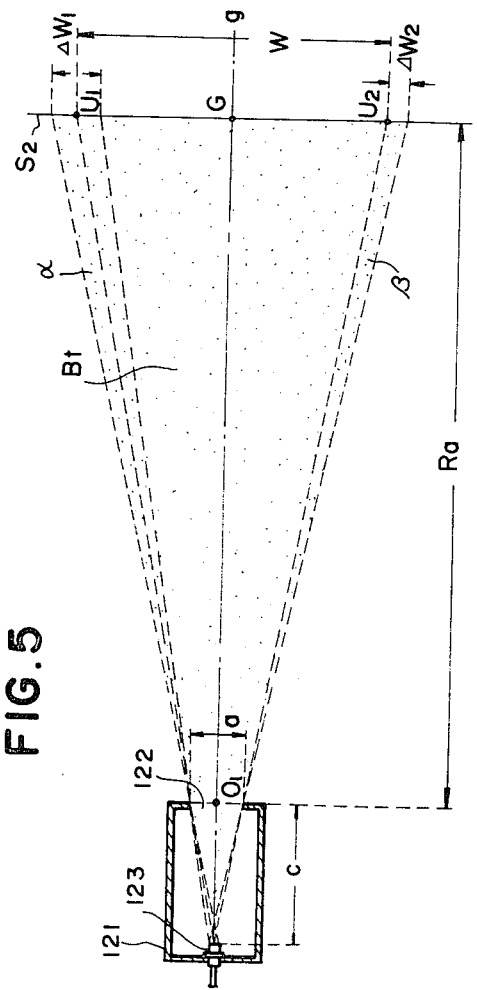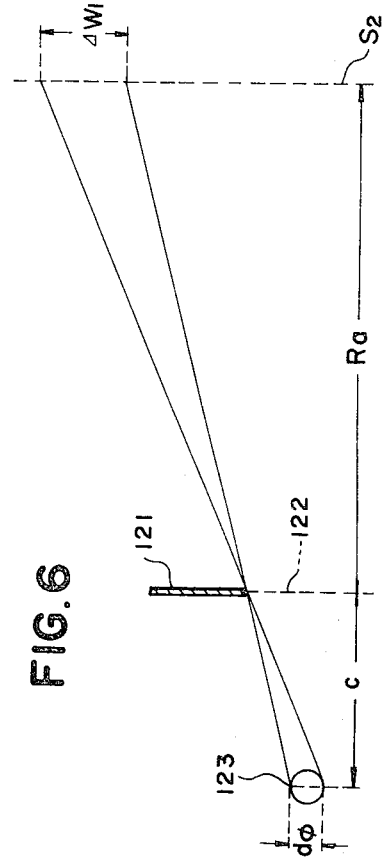
FIG.5
FIG.6

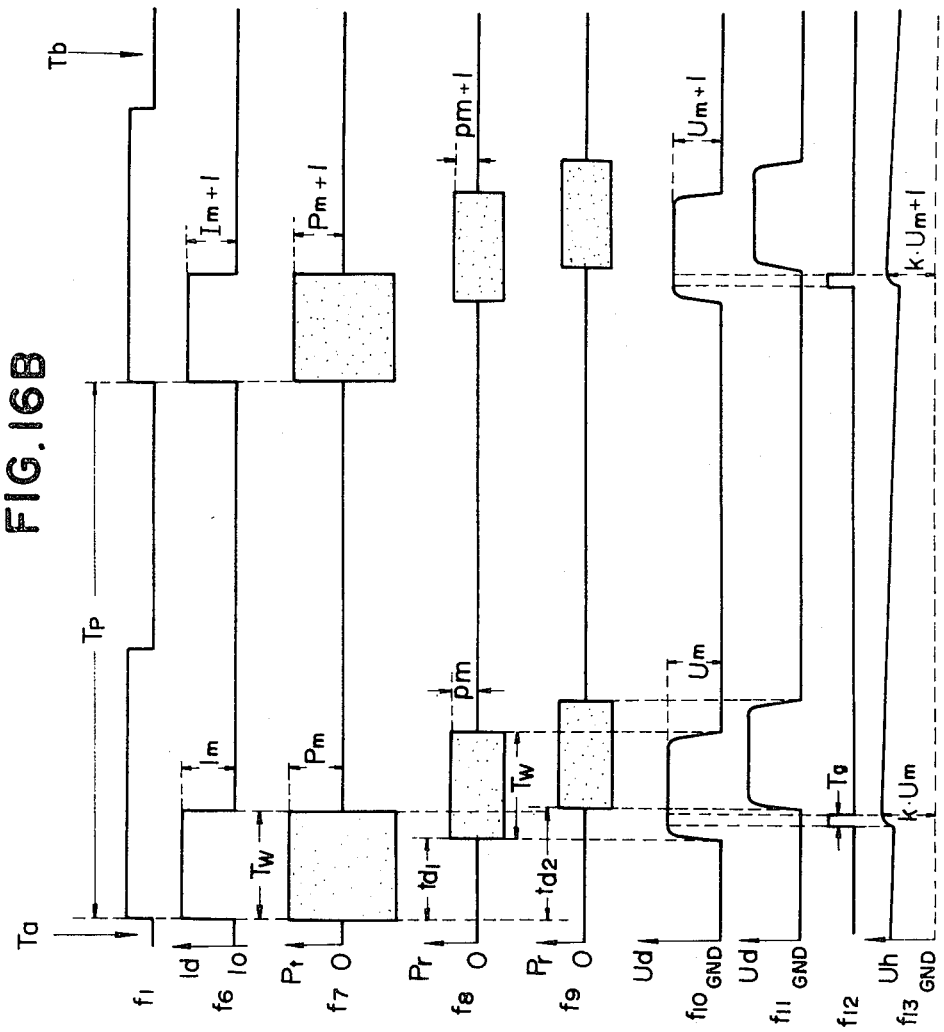

OBSTACLE DETECTOR FOR A VEHICLE

BACKGROUND OF THE INVENTION

1. Field of the Invention

The present invention relates to an obstacle detector for a vehicle, and more particularly to an apparatus for detecting an obstacle which is present in the path of a traveling vehicle, by emitting light and detecting the light reflected by the obstacle.

2. Description of the Prior Art

In the past, obstacle detectors have been proposed which radiate ultrahigh frequency electromagnetic waves in the microwave or millimeter wavelength range, and detect the waves reflected by an obstacle present in the path of the vehicle, thereby detecting the obstacle. Such detectors, however, have the following disadvantages due to use of the ultrahigh frequency waves:

(1) The costs of components for ultrahigh frequency use are high compared with those of components for use at lower radio frequencies. Therefore, a detector for such ultra high frequency use is relatively expensive.

(2) When a transmitting and receiving antenna is designed so that its power half-width at a frequency of 35 GHz is ±2°, the minimum size of the antenna is about 150 millimeters. Thus the mounting of the antenna on a vehicle presents space problems.

(3) The wave length of such ultrahigh frequency is relatively long, for example about 1 cm (30 GHz) at a minimum. Thus although the directivity of the antenna is sharp, the limit of the detection area is unclear. An obstacle of high reflectivity, in the vicinity of the detection area, may be falsely detected.

The present invention intends to eliminate these defects and problems.

SUMMARY OF THE INVENTION

In an obstacle detector according to the present invention, a pulse signal generator is provided for producing a first pulse signal having a pulse width substantially equal to twice the travel time required for light to travel a braking distance. A light transmitter transmits a light beam signal representing the first pulse signal so as to cover a detection area in which the braking distance is contained. A photoreceptor detects the light signal reflected by an obstacle present in the detection area and converts the received light beam signal to a second corresponding electric pulse signal. A determination device determines whether the time width of a pulse of the first signal is larger than the time interval taken from the time when the corresponding pulse of the light signal is transmitted to the time when the pulse of the light signal is received by the photoreceptor after reflection by the obstacle.

A modulator may be provided for modulating the amplitude of the output of the pulse signal generator with a modulation frequency signal lower than that of the first signal and peculiar to the vehicle. The light receiver may be provided with a demodulator to detect the modulated signal.

The detector according to the present invention utilizes relatively inexpensive optical parts compared with prior art ultrahigh frequency parts, thereby reducing the cost of the detector. The light transmitter and receiver have small openings through which light beams are transmitted and received, compared with prior art ultrahigh frequency antennas, thereby making mounting of the detector straightforward. Use of a light beam improves the sharpness of the limits of the detection area, thereby preventing false detection of an obstacle.

Other objects, features and advantages of the present invention will be more clear from the following description of a predetermined embodiment thereof, in conjunction with the accompanying drawings.

BRIEF DESCRIPTION OF THE DRAWINGS

In the drawings:

FIG. 5 is an illustration of blurring of a light beam;

FIG. 6 is an enlarged view of part of FIG. 5;

FIGS. 16A, 16B and 16C are timing charts for the detector according to the present invention;

DETAILED DESCRIPTION OF THE PREFERRED EMBODIMENT

Figure 1:
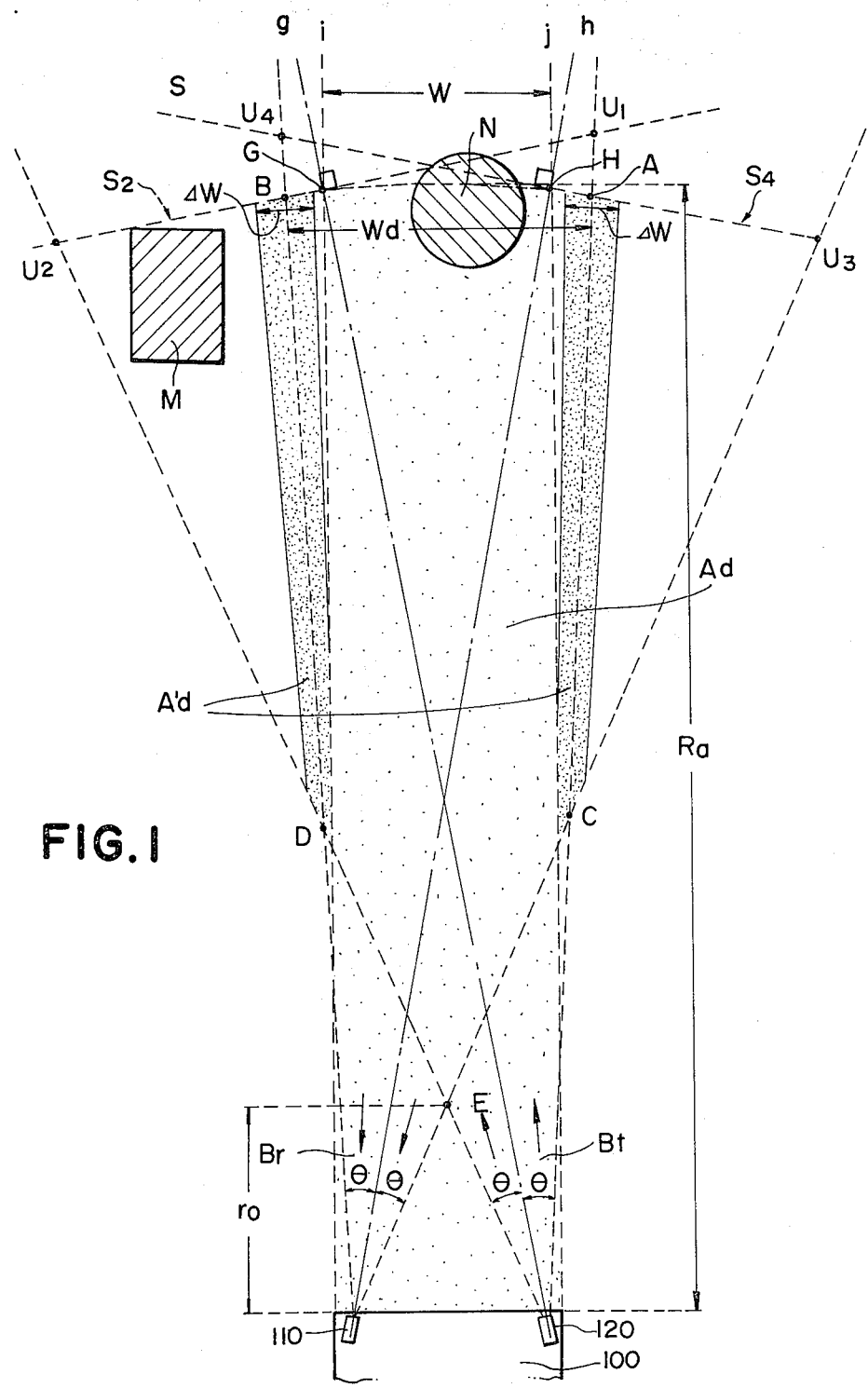
FIG. 1 is a plan illustration of a detection area for a vehicle.

FIG. 1 illustrates the detection area for an automotive vehicle 100 of which part is shown schematically.

The path of the vehicle 100 is defined for these purposes as an area having a width W between the right side extension j and left side extension i of the vehicle. A photoreceptor 110 mounted on the left forward corner of the vehicle receives light $B_r$ converging from an area of angular width $2\theta$ and has an optical axis h dividing the angle $2\theta$ into equal angles $\theta$, where $\theta$ is about 2.0° to 2.5°. The left side limit of the converging area substantially coincides with the line of the left side of the vehicle 100. The optical axis h intersects the direct line j at a point H about 50 meters forward of the vehicle. A light beam transmitter 120 mounted on the right forward corner of the vehicle 100 transmits a light beam $B_t$ diverging with an angular width $2\theta$ from the transmitter 120 and having an optical axis dividing the angle $2\theta$ into equal angles $\theta$. The right side limit of the beam $B_t$ substantially coincides with the right side of the vehicle. The optical axis g intersects the direct line i at a point G about 50 meters forward of the vehicle 100. The area where the transmitted beam $B_t$ and the receiving area overlap, and within a distance of $R_a$ from the vehicle 100, i.e. the area enclosed by a block which is formed by straight lines through points A, B, D, E and C in that order, is the detection area $A_d$. If there is an obstacle N in the area $A_d$, the detector detects the obstacle N and produces a warning. The setting of the distance $R_a$ will be described hereinafter in more detail, but here will be briefly described. If we designate the vehicle speed by $U_a$ (m/s), the driver response time lag by $T_d$, and the maximum deceleration during the braking of the vehicle by $\delta$, the distance $R_a$ is expressed by $$R_a = (U_a \cdot T_d + U_a^2/2\delta) \quad (1)$$

where $U_a \cdot T_d$ is the distance that the vehicle has traveled for the response time lag and $U_a^2/2\delta$ is the braking distance, $R_a$ being set to 50 meters in FIG. 1. Thus $R_a$ represents the overall distance traveled before the driver can stop the vehicle after seeing an obstruction. A blurred area $A'_d$ having a width $\Delta W$ will occur at each side of the light beam due to dispersion of the beam which is produced by the configuration of the light transmitter 110 and due to diffraction of the light at the edges of the opening in the light transmitter through which the light beam is transmitted outward. Reference character M denotes an obstacle outside the detection area $A_d$.

Figure 2:
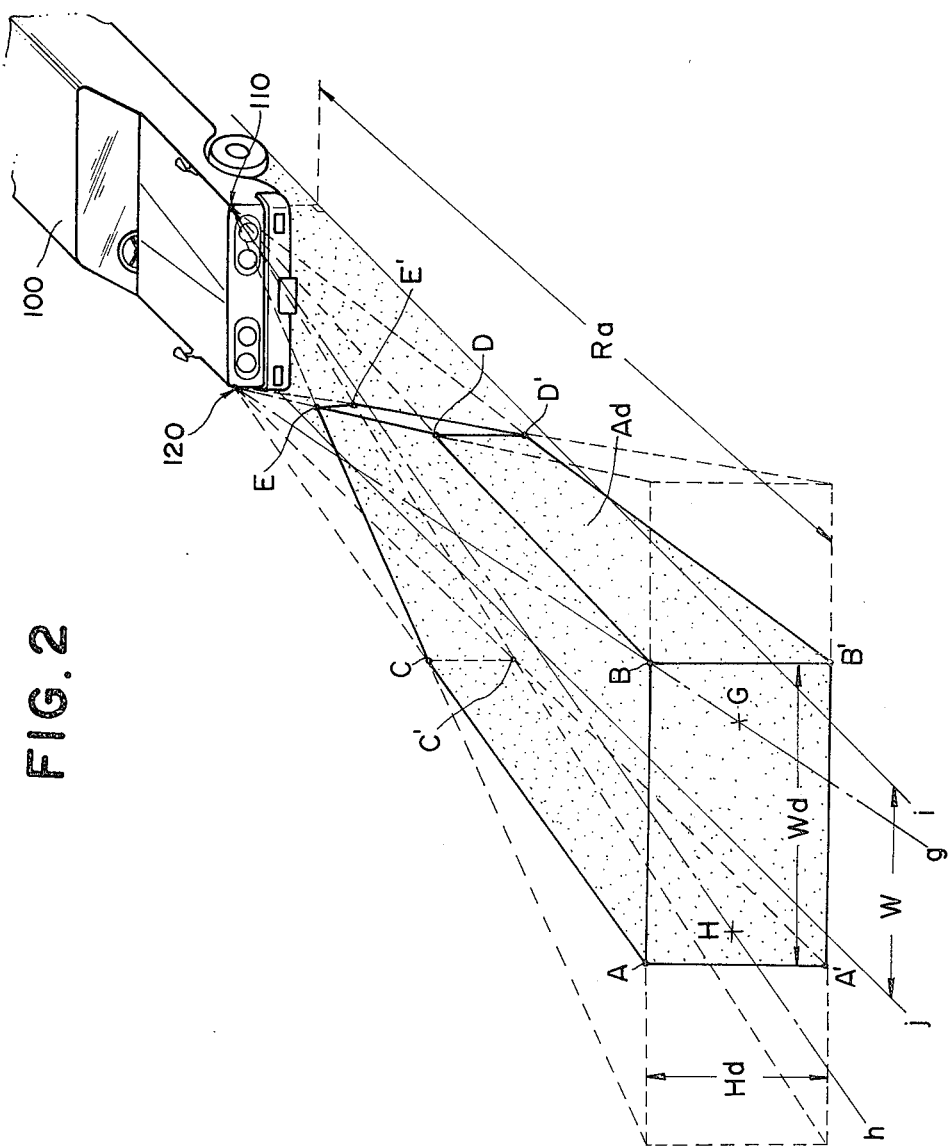
FIG. 2 is a perspective illustration of the detection area of FIG. 1.

In FIG. 2, the detection area $A_d$ is defined by the planes containing the points: AA'BB', BB'DD', DD'EE', EE'CC', CC'AA',ABDEC, A'B'D'E'C'. For convenience of later description, planes $S_2$ and $S_4$ are also indicated each at a distance of 50 m from the light transmitter 120 and the photoreceptor 110, respectively in FIG. 1. The plane $S_2$ intersects the optical axis g orthogonally at a point G, and the plane $S_4$ intersects the optical axis h orthogonally at a point H. If E designates the point of the detection area $A_d$ nearest the vehicle 100, then the distance $r_0$ between the point E and the forward edge of the vehicle 100 is about 9 m, the width $W_d$ of the detection area $A_d$ is about 2 m, and the height $H_d$ (AA' or BB') of the area is 1 m.

Figure 3:
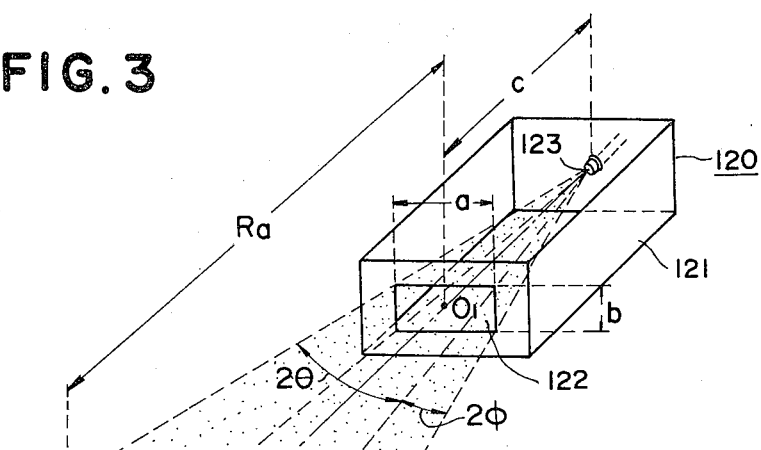
FIG. 3 is a perspective illustration of the concept of a light transmitter.

In FIG. 3, the light transmitter 120 includes a black box 121, 30 mm (wide) $\times$ 10 mm (high) $\times$ 210 mm (deep) having a window 122 of size $a \times b$ in which a transparent member is fitted. A light emitting element 123 such as a laser diode (LD) or a light emitting diode (LED) is fixed to the back wall of the box 121 so that the optical axis of a light beam transmitted from the light emitting element 123 intersects the window 122 so as to pass the center $O_1$ of the window normal thereto. The light emitting element 123 has a light emitting surface of about 1 mm diameter. If the distance C between the light emitting surface of the element 123 and the window 122 is 200 mm, then if the points where the plane $S_2$ at the distance $R_a=50$ m from the forward end of the vehicle and the transmitted beam $B_t$ intersect are $U_1$, $U_1'$, $U_2$, $U_2'$, the following holds because $U_1U_2=2W_d=4.0$ m, and $U_1U_1'=H_d=1.0$ m:

$$(a/2W_d)=(b/H_d)=(c/R_a) \quad (1)$$

Substituting into the expression (1) $c=200$ mm, $R_a=50$ m $=5\times10^4$ mm, $2W_d=4.0$ m $=4\times10^3$ mm, and $H_d=1.0$ m $=10^3$ mm, the window size is thus $a=16$ mm and $b=4$ mm. When a light beam having a peak wavelength $\lambda_p$ ($\geq 0.8$ μm) in the infrared area and having a power half-width $\Delta\lambda$ is transmitted through the window 122 from the light emitting element 123, a sharp transmitted light beam having a horizontal angular width $2\theta$ in the range 4.0° to 5.0° and a vertical angular width $2\phi$ in the range 1.0° to 1.5° is obtained.

Figure 4:
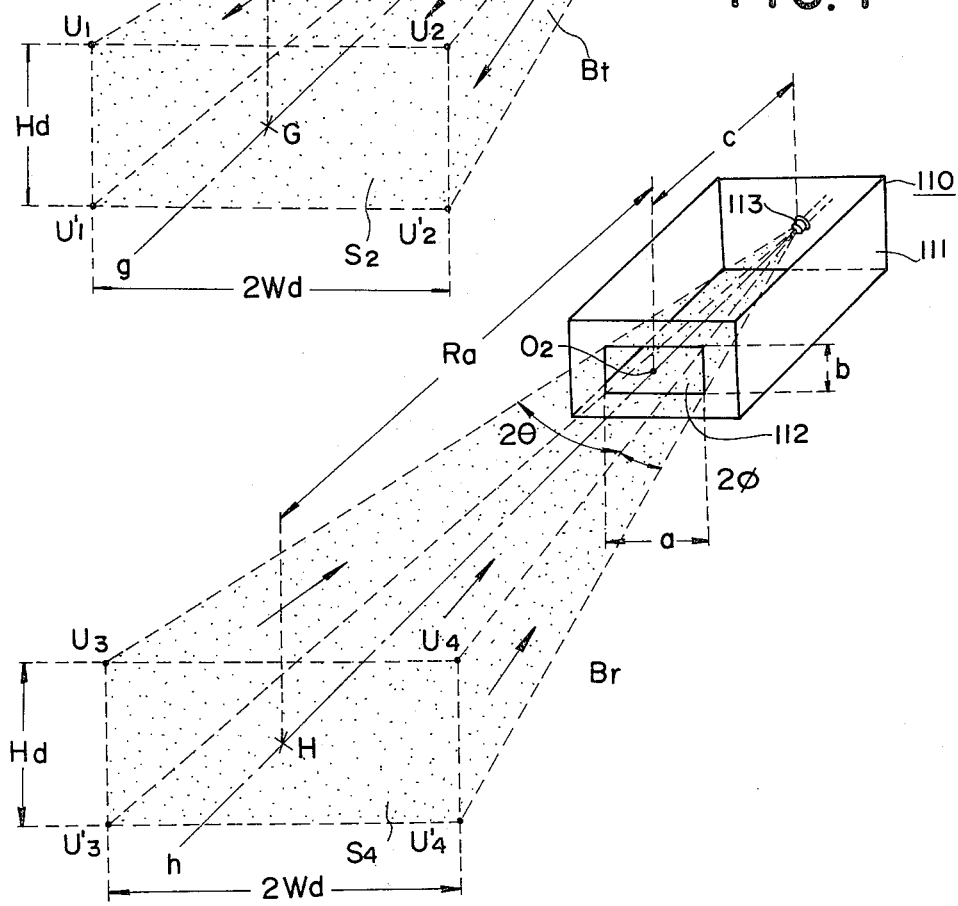
FIG. 4 is a perspective illustration of a photoreceptor.

In FIG. 4, the photoreceptor 110 is provided with a black box 111 of a size of 30 mm wide $\times$ 10 mm high $\times$ 210 mm deep and has in the front wall of the box 111 a window 112 of size $a \times b$ in which is provided an interference filter having a central wave length $\lambda_c$, and a 3 dB pass band width $\Delta B$ (selected so that $\lambda_0 = \lambda_p \cdot \Delta B \geq \Delta\lambda$). The box 111 is provided with a light receiving photoelectric element 113 such as, for example, an avalanche diode (APD) or a PIN photodiode (PIN) on the rear wall of the box so that the optical axis h of the converging beam received by the diode passes the center $O_2$ of the window 112 normal thereto. If the receiving element 113 has a light receiving surface of about 1 mm diameter, and the distance C between the light receiving surface of the receiving element 113 and the window 112 is 200 mm, then if the points where the plane $S_4$ at a distance $R_a=50$ m from the forward end of the vehicle and the received beam $B_r$ intersect are $U_3$, $U_3'$, $U_4$, $U_4'$, the window 112 size is approximately $a=10$ mm, and $b=4$ mm since $U_3U_4=2W_d$, and $U_3U_3'=H_d$. Because of the size of the window 112 in which the interference filter is fitted and the positional relationship of the light receiving element 113 to the window 112, a sharp received beam $B_r$ is obtained having a horizontal angular width of $2\theta$ in the range 4.0° to 5.0° and a vertical angular width of $2\phi$ in the range 1.0° to 1.5°.

As will be seen in FIG. 5, blurring occurring along each edge of the light beam includes a component $\alpha$ due to the finite size of the light source and a second component $\beta$ due to diffraction of the beam by the edge of the window 122, which will be described below.

In FIG. 6, the beam blurring due to the finite size of the light source is shown. If the width of the blurring of the light beam in the plane $S_2$ at the distance $R_a=50$ m from the forward end of the vehicle is $\Delta W_1$, and the diameter of the light emitting element 123, which is the light source, is d mm, the following holds:

$$(d/C)=(\Delta W_1/R_a) \quad (2)$$

Substituting into the expression (2) $d=1$ mm, $C=200$ mm, and $R_a=50$ m $=5\times10^4$ mm, we obtain an approximate value for $\Delta W_1$ of 250 mm.

Figure 7:
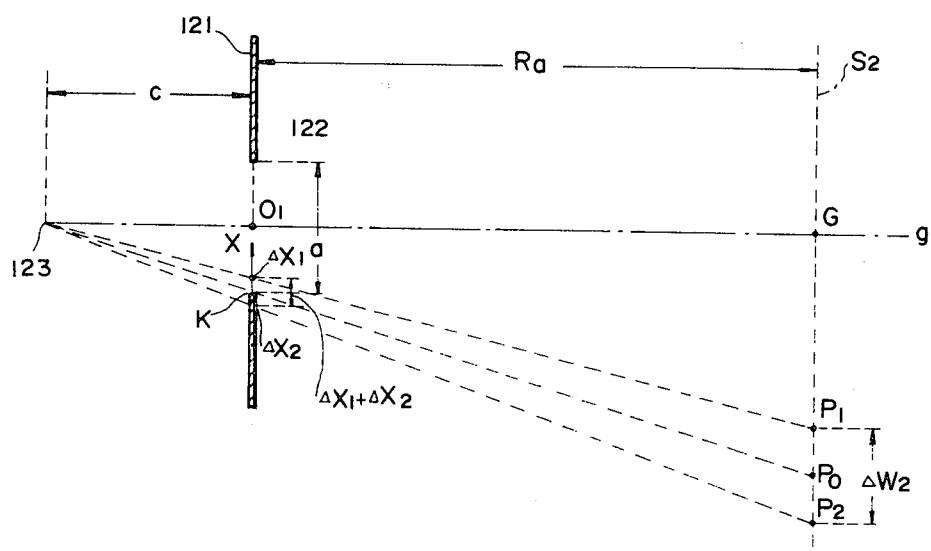
FIG. 7 is an enlarged illustration of the blurring of FIG. 5.

FIG. 7 shows blurring due to the diffraction of the transmitted light beam at the edge of the window 122. This diffraction is of a Fresnel type well known in the art (For example, see "Kogaku Gijutsu Handbook" (Optical Technique Handbook), p 82, published by Asakura Shoten in Japan). If the light emitting element 123 is supposed to be a point-source, and an X axis is supposed present on the window 122, having origin K and positive in the direction of the point $O_1$, the area in which the light beam is blurred due to diffraction corresponds to the area of $-\Delta X_2 \leq X \leq \Delta X_1$.

Applying to the above inequality, Babinet's principle disclosed in the Optics Handbook, p. 95, the width of the blurring is substantially the range $-1 \leq \epsilon_1 \leq 1$, from FIG. 20 of the reference, for a variable $\epsilon_1$ represented by the equation (3) and given as an ordinate on a spiral curve representing a Fresnel integration. Substituting the respective FIG. 7 conditions into (2. 240) on page 93 of the reference:

$$\epsilon_1 \cong X \left\{ \frac{2}{\lambda_p} \left( \frac{1}{C} + \frac{1}{R_a} \right) \right\}^{\frac{1}{2}} \quad (3)$$

Since $C=200$ mm, $R_a=5\times 10^4$ mm and $C<<R_a$, the equation (3) is simplified to $$\epsilon_1 \cong X \left( \frac{2}{\lambda_p C} \right)^{\frac{1}{2}} \quad (4)$$

Substituting $\lambda_p=1$ $\mu$m$=10^{-3}$ mm into the equation (4), $$\epsilon_1 \cong X \left( \frac{2}{10^{-3} \times 2 \times 10^{-2}} \right)^{\frac{1}{2}} \cong 3X \quad (5)$$

Since the range of the blurring is $-1 \leq \epsilon_1 \leq 1$, substituting the equation (5) into this inequality:

$$-1 \leq 3X \leq 1 \quad -\frac{1}{3} \leq X \leq \frac{1}{3} \quad (6)$$

Comparing the expression (6) with the FIG. 7 blurring range $-\Delta_2 \leq X\Delta \leq X_1$, we obtain $\Delta X_1 = \frac{1}{3}$ and $\Delta X_2 = \frac{1}{3}$.

If we designate by $P_1$ the point where the line connecting the light source 123 with $\Delta X_1$ intersects the plane $S_2$ and, by $P_2$, the point where the line connecting the light source 123 with $-\Delta X_2$ intersects the plane $S_2$, the blur width on the plane $S_2$ is given by $P_1P_2=\Delta W_2$ which is obtained from FIG. 7 by the following expression:

$$\frac{\Delta W_2}{Ra} = \frac{\Delta X_2 + \Delta X_1}{C} = \frac{1}{C} \times \frac{2}{3} \quad (7)$$

Substituting $Ra=5\times 10^4$ and $C=2\times 10^2$ into the expression (7), we obtain $$\Delta W_2 \cong \frac{2}{3 \times 2 \times 10^2} \times 5 \times 10^4 \cong 1.7 \times 10^2 \text{ mm.}$$

The sum $\Delta W = \Delta W_1 + \Delta W_2$ of the blurring widths $\alpha$ and $\beta$ is substantially equal to 420 mm, which is the horizontal width of the blurring on the side edge of the transmitted light beam $B_t$. Since the received light beam is essentially the same in geometry as the transmitted beam, the magnitude of the blurring in the case of the received beam may be considered to be substantially the same as that in the case of the transmitted beam. Thus the blurring of the detection area $A_d$ is shown by the area $A'_d$ in FIG. 1.

Figure 8:
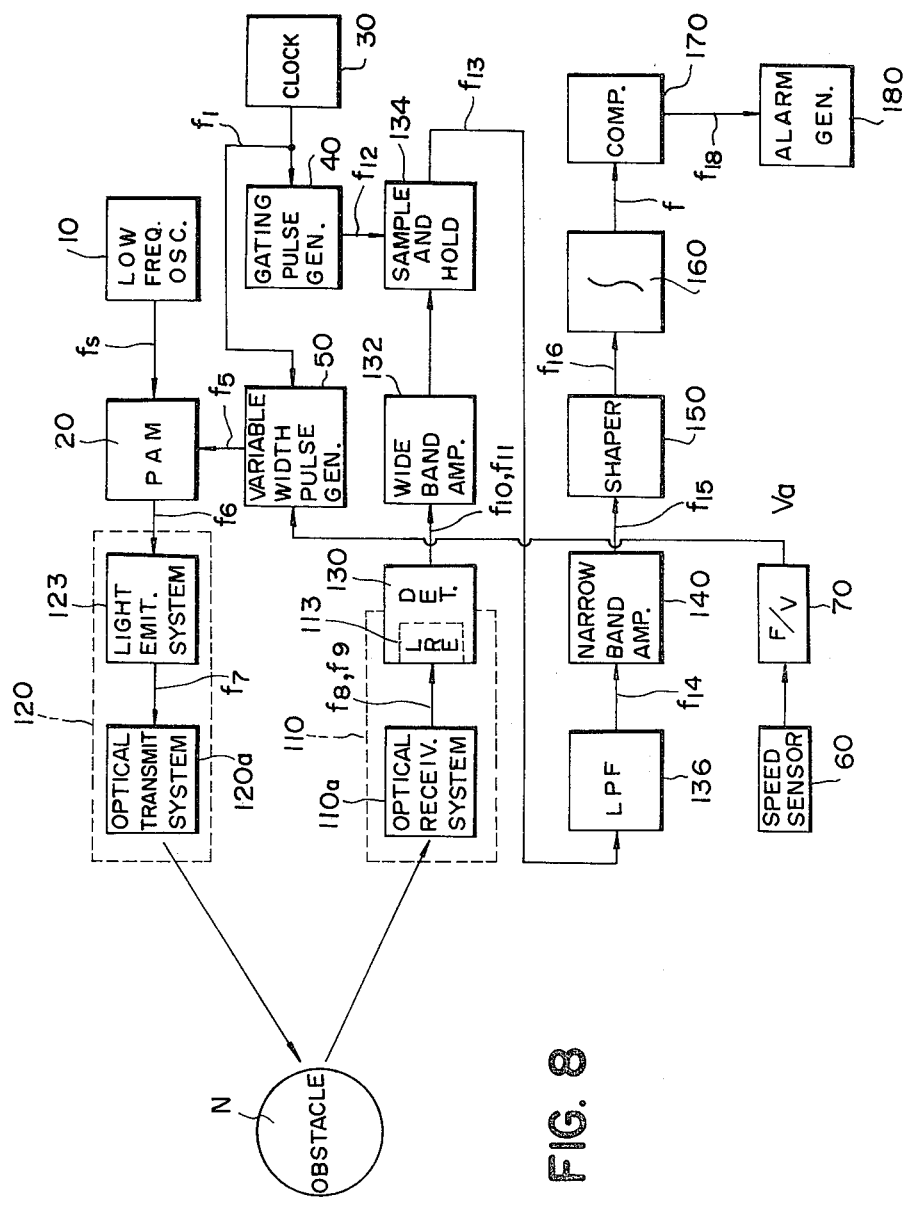
FIG. 8 is a block diagram of a preferred embodiment of an obstacle detector according to the present invention.

In FIG. 8, the preferred embodiment of an obstacle detector according to the present invention includes a low frequency oscillator 10, a pulse amplitude modulator (PAM) 20, a clock pulse generator 30, a gating pulse generator 40, a variable width pulse generator 50, the last two being connected to the clock pulse generator 30, and a frequency/voltage (F/V) converter 70 which converts a frequency signal from a vehicle speed sensor 60 to a voltage signal whose amplitude is proportional to the frequency of the frequency signal and which is applied to the variable width pulse generator 50. It further includes a light beam transmitter 120 which receives a modulated signal from the modulator 20 and transmits a light beam, the light beam transmitter including a light emitting element 123 and a transmitting optical system 120a, a photoreceptor 110 which receives a light beam reflected back by an obstacle N, the photoreceptor including an optical receiving system 110a, which includes the window 112 and the interference filter provided therein, as shown in FIG. 4 and a light detector 130 including a light receiving element 113, and a wide band amplifier 132 which receives the output of the photoreceptor 110. It further includes: a sample and hold circuit 134 which is connected to the gating pulse generator 40 and which receives the output of the wide band amplifier 132; a low-pass filter (LPF) 136 connected to the hold circuit 134; a narrow band frequency amplifier 140 which amplifies the output of the low-pass filter 136; a wave shaper 150 which shapes the output of the frequency amplifier 140; an integrating circuit 160 which integrates the output of the wave shaper 150; a comparator 170 which compares the integrated value from the integrating circuit 160 with a predetermined value; and a warning device 180 which is responsive to the output of the comparator 170 to give a warning.

In operation, a sinusoidal signal $f_s$ having a low frequency $f_0$ generated by the low frequency oscillator 10 is applied to the pulse amplitude modulator 20. A clock signal $f_1$ having a period $T_p$ generated from the clock pulse generator 30 is applied to the gating pulse generator 40 and the variable width pulse generator 50. The vehicle speed signal sensed by the vehicle sensor 60 and having a pulse frequency proportional to the vehicle speed $U_a$ is input to the F/V converter 70 to produce a voltage representing the vehicle speed $U_a$ (m/s) which is inputted to the variable width pulse generator 50.

Figure 9:
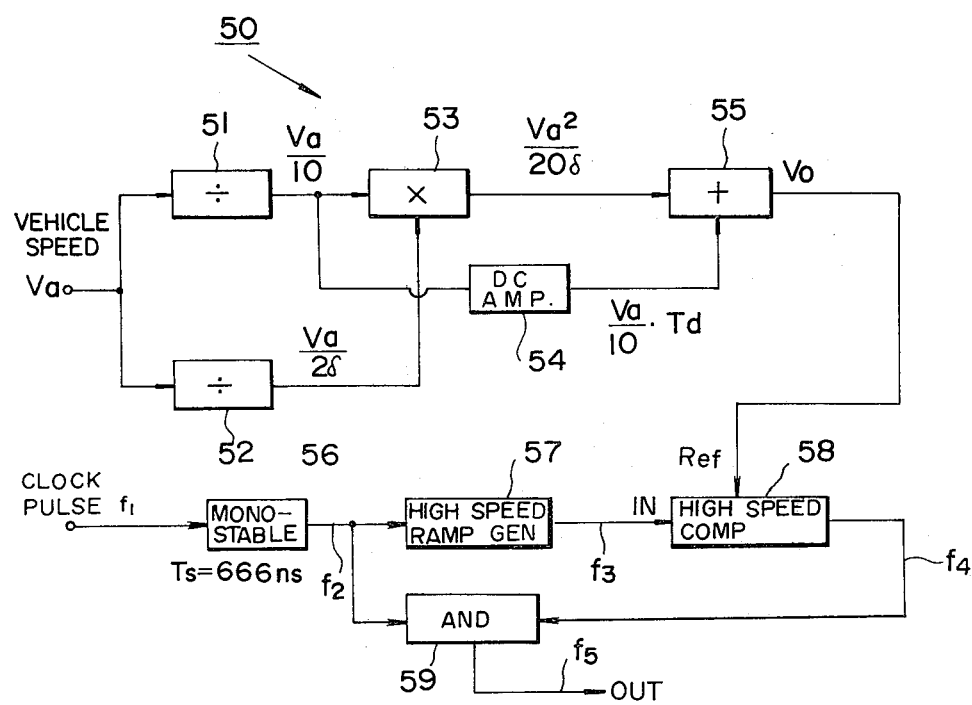
FIG. 9 is a block diagram of a variable width pulse generator used in the circuit of FIG. 8.
Figure 10:
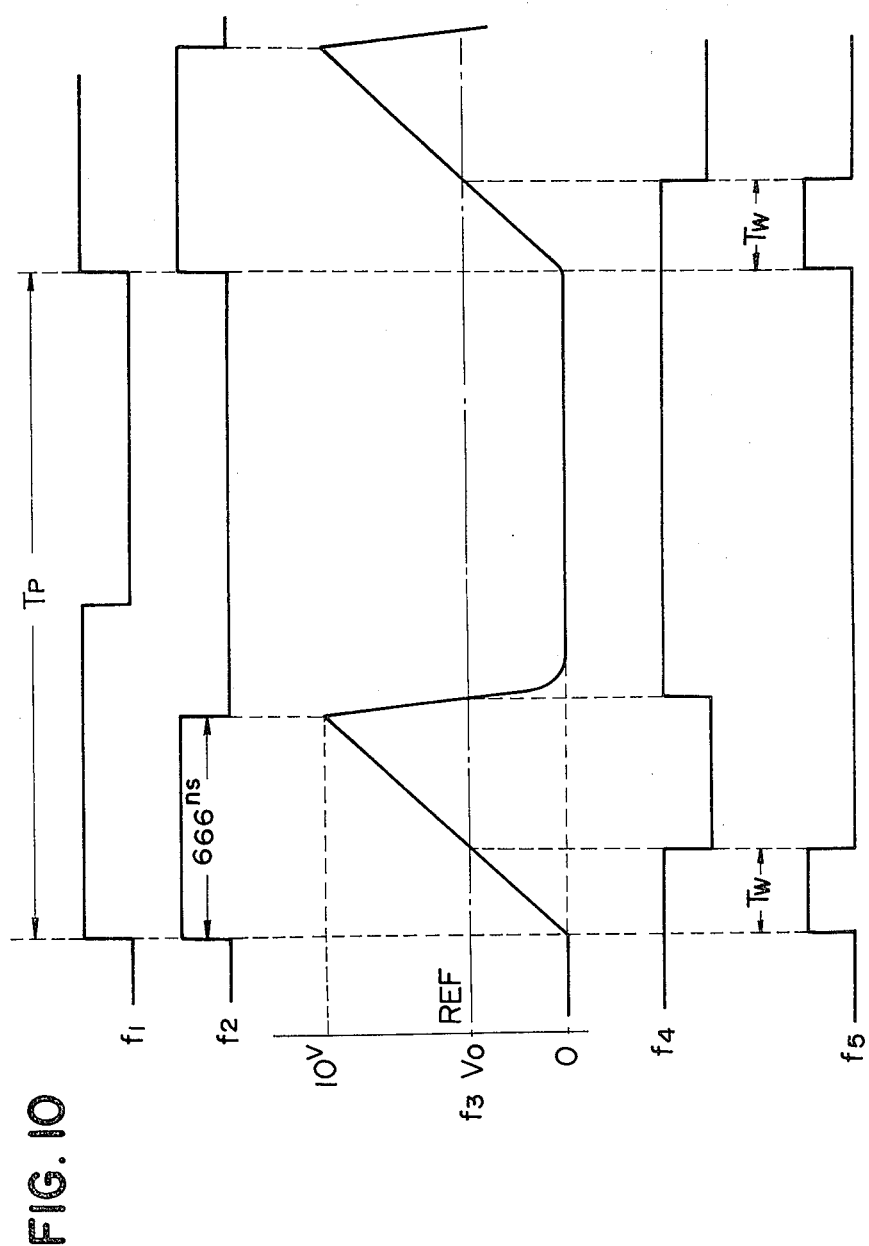
FIG. 10 is a timing chart for the generator in FIG. 9.

In FIG. 9, the details of the variable width pulse generator 50 are shown. FIG. 10 is a timing chart for the generator 50. The voltage $V_a$ representing the vehicle speed $U_a$ is inputted to a voltage divider 51 to produce a voltage $V_a/10$, and the voltage $V_a$ is also inputted to a voltage divider 52 to produce a voltage $V_a/2\delta$ where $\delta$ is a maximum deceleration (m/s$^2$). These voltages $V_a/10$ and $V_a/2\delta$ are inputted to a multiplier 53 to produce a voltage $V_a/20\delta$. The voltage $V_a/10$ is also inputted to a DC amplifier 54 to multiply it by a factor of $T_d$ to represent the driver's response time lag (sec), thereby producing a voltage $(V_a/10)\cdot T_d$. These voltages $(V_a/10)\cdot T_d$ and $V_a^2/20\delta$ are inputted to an adder 55 to produce an output $V_0$ given by $$V_0 = \frac{1}{10} \left( \frac{V_a^2}{2\delta} + V_a \cdot T_d \right) \quad (8)$$

The clock pulse signal $f_1$ is inputted to a monostable multivibrator 56 having a metastable time $T_2=666$ ns to produce a pulse signal $f_2$ having a period of $T_p$ which in turn is applied to a high-speed ramp function generator 57 to produce a high-speed sawtooth waveform signal $f_3$ having a peak value of 10 volts. This signal $f_3$ is inputted to a high-speed comparator 58 to compare the voltage $V_0$ with a reference voltage, thereby providing a pulse signal $f_4$ which is inputted together with the signal $f_2$ to an AND gate 59, thereby producing a pulse signal $f_5$ having a pulse width $T_w$ and a period of $T_p$. The pulse width $T_w$ of the signal $f_5$ changes depending upon the reference voltage $V_0$.

The relationship between the pulse width $T_w$ and the vehicle speed $U_a$ will now be sought. The sawtooth wave signal $f_3$ changes through a range of 10 volts in a time $t = 666$ ns, and therefore the pulse width $T_w$ and the voltage $V_0$ have the following relationship:

$$T_w = 666 \times \frac{V_0}{10} \text{ (ns)} \qquad (9)$$

Substituting the expression (9) into the expression (8), and rearranging it, $$T_w = 6.6 \times \left( \frac{V_a^2}{2\delta} + V_a \cdot T_d \right) \times 10^{-9} \text{ (sec)} \qquad (10)$$

If light makes outward and return journeys, each having a length $R_a$, in the time $T_w$, is given by $$R_a = 3 \times 10^8 \times \frac{T_w}{2} \text{ (m)} \qquad (11)$$

Substituting the expression (11) into the expression (10) and rearranging it, $$R_a = \frac{V_a^2}{2\delta} + V_a \cdot T_d \qquad (12)$$

Substituting the vehicle speed $U_a$(m/s) for the voltage $V_a$ the expression (12) is simplified to $$R_a = \frac{U_a^2}{2\delta} + U_a \cdot T_d \qquad (13)$$

where $\delta$ is the deceleration (m/s²) and $T_d$ is the driver's response time lag (constant: sec). The first item of the expression (13) is the actual braking distance of the vehicle and the second item is the distance which the vehicle travels during the driver's response time. Therefore, the distance $R_a$ which is the range of a return journey made by light within the interval $T_{w/2}$ is equal to the overall braking distance for the vehicle at speed $U_a$ including the driver response lag and until the vehicle has stopped. The distance $R_a$ is the range of the detection area $A_d$ of FIG. 1 in the direction the vehicle is traveling. In other words, the time required for light transmitted from the light transmitter 120 to reach and to be reflected by an obstacle N present at the distance $R_a$ from the forward end of the vehicle in the detection area $A_d$ in the direction the vehicle is traveling and to be received by the photoreceptor 110 corresponds to the pulse width $T_w$ of the signal $f_5$. As stated above, the pulse signal $f_5$ whose pulse width $T_w$ changes depending on the vehicle speed $U_a$ is obtained, as shown by the equation (10).

When the pulse signal $f_5$ from the variable width pulse generator 50 is inputted into the pulse amplitude modulator 20, this modulator outputs a pulse amplitude modulation signal $f_6$ based on a sinusoidal signal $f_s$ peculiar to the vehicle and which is inputted to the light emitting element 123. There are two reasons by the pulse signal $f_5$ is modulated by the sinusoidal signal $f_s$: firstly to distinguish the signal used in one vehicle from the signals used in other vehicles, and secondly to enable a narrow band amplifier to be used to reduce the noise level in the obstacle detector.

Figure 11:
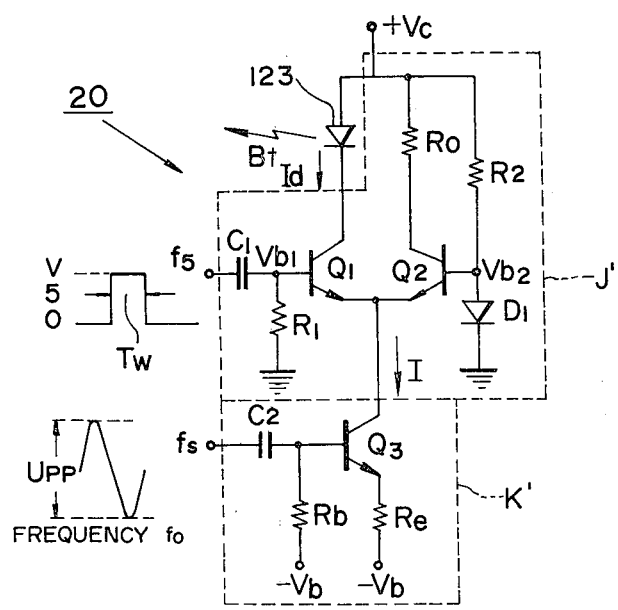
FIG. 11 is a circuit diagram of a pulse amplitude modulator in FIG. 8.
Figure 12:
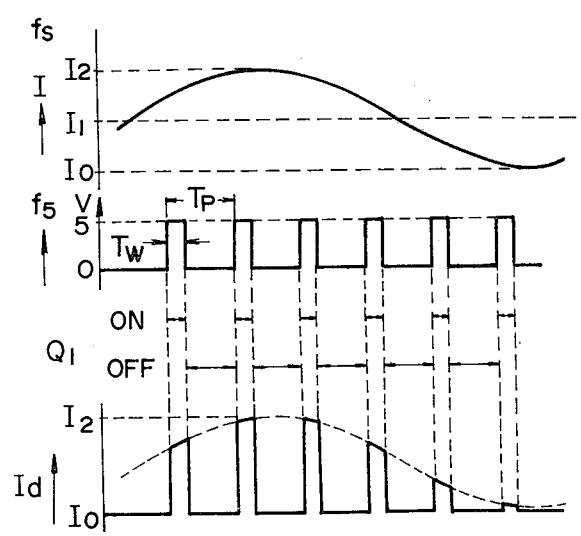
FIG. 12 is a timing chart for the modulator of FIG. 11.
Figure 13:
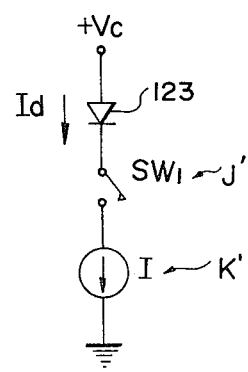
FIG. 13 is an equivalent circuit of the circuit in FIG. 11.

In FIG. 11, the pulse amplitude modulator 20 includes a light emitting element 123 which radiates a light beam $B_t$, a pair of transistors $Q_1$ and $Q_2$, resistors $R_1$, $R_2$ and $R_0$, a diode $D_1$ and a capacitor $C_1$, enclosed in a broken line block J', and a transistor $Q_3$, resistors $R_b$ and $R_e$, and a capacitor $C_2$, enclosed in a broken line block K'. In FIG. 12, the pulse signal $f_5$ having a pulse width $T_w$ is applied to the terminal of the block J', and the sinusoidal signal $f_s$ having an amplitude of Upp and a frequency of $f_0$ is inputted to the terminal of the block K'. The FIG. 11 circuit is represented by an equivalent circuit, shown in FIG. 13, composed of an analog switch J' and a constant current source K'. The block J' is an emitter coupled logic circuit in which the transistors $Q_1$ and $Q_2$ operate as a high-speed switch (SW$_1$) of the current switching type. The block K' is an emitter follow type constant current circuit in which the electric current I flows in the collector of the transistor $Q_3$ proportional to a change in the voltage of the sinusoidal signal $f_s$ applied to the input terminal of the block K', shown in FIG. 12. The electric current I is set as follows:

$$I = I_1 + (I_1 - I_0) \sin 2\pi f_0 t \qquad (14)$$

In this case, $I_1$ is adjusted by the circuit constants $V_e$, $V_b$ and $R_e$ as follows:

$$I_1 = \frac{V_e - V_b - 0.7}{R_e} \text{ (V)} \qquad (15)$$

As stated above, since the pulse signal $f_5$ is applied to the input terminal of the circuit J', when the signal $f_5$ changes from 0 to 1, the base voltage $V_{b1}$ of the transistor $Q_1$ which is normally turned off becomes high compared with the base voltage $V_{b2}$ of the transistor $Q_2$, the transistor $Q_1$ is turned from off to on, and the transistor $Q_2$ is turned from on to off. Thus the electric current $I_d$ flows in the light emitting element 123. When the signal $f_5$ changes from 1 to 0, the transistor $Q_1$ returns from on to off, and the current flowing through the light emitting element 123 is returned to 0. That is, only while the signal $f_5$ is at 1, the transistor $Q_1$ is in the on situation and the electric current $I_d$ flows in the light emitting element 123. The peak value of the current $I_d$ is a pulse amplitude modulation signal whose envelope coincides with the constant current signal I.

Figure 14:
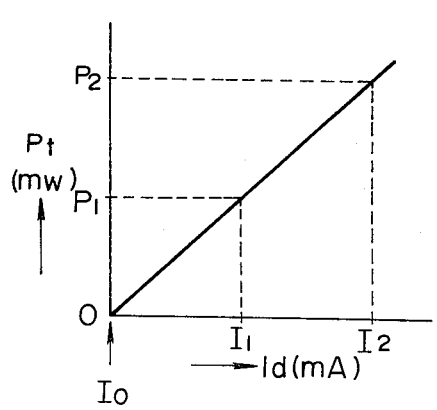
FIG. 14 is a graph showing the relationship between the current and output power of a light emitting element.

When a light emitting diode (LED) is used as the light emitting element 123, the relationship between the current $I_d$ of the light emitting diode and the light emitting power $P_t$ is as shown in FIG. 14. If it is arranged that $I_0 = 0$ and $I_2 = 2I_1$, the envelope $P_{te1}$ is given by $$P_{te1} = P_1(1 + \sin 2\pi f_0 t) \qquad (16)$$

If the amplitude of the sinusoidal signal $f_s$ is designated by Upp, the following relationship is required:

$$2I_1 R_E \cong U_{pp} \qquad (17)$$

Figure 15:
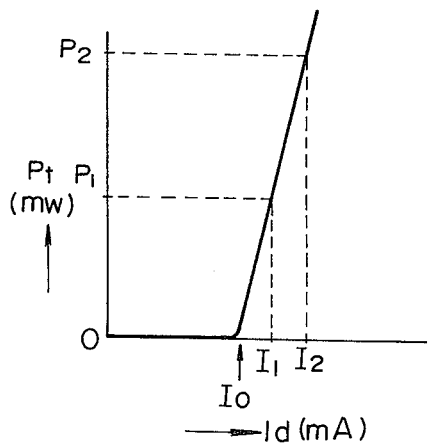
FIG. 15 is a graph, similar to FIG. 14, for another light emitting element.

When a laser diode (LD) is used as the light emitting diode 123, the relationship between the current $I_d$ of the laser diode and the light emitting power $P_t$ is as shown in FIG. 15. If $I_0$ and $I_2$ are selected so that $I_0 = I_{th}$ (threshold current value) and $I_2 = 2I_1 - I_{th}$, the envelope $P_{te2}$ of the pulse amplitude modulation signal of the light emitting power $P_t$ is represented by $$P_{te2} = P_1 (1 + \sin 2\pi f_0 t) \tag{18}$$

This equation is completely the same as the equation (16). If we designate the amplitude of the sinusoidal signal $f_s$ by Upp, the following relationship is required:

$$2(I_1 - I_{th}) \cdot R_e \cong Upp \tag{19}$$

Figure 16A:
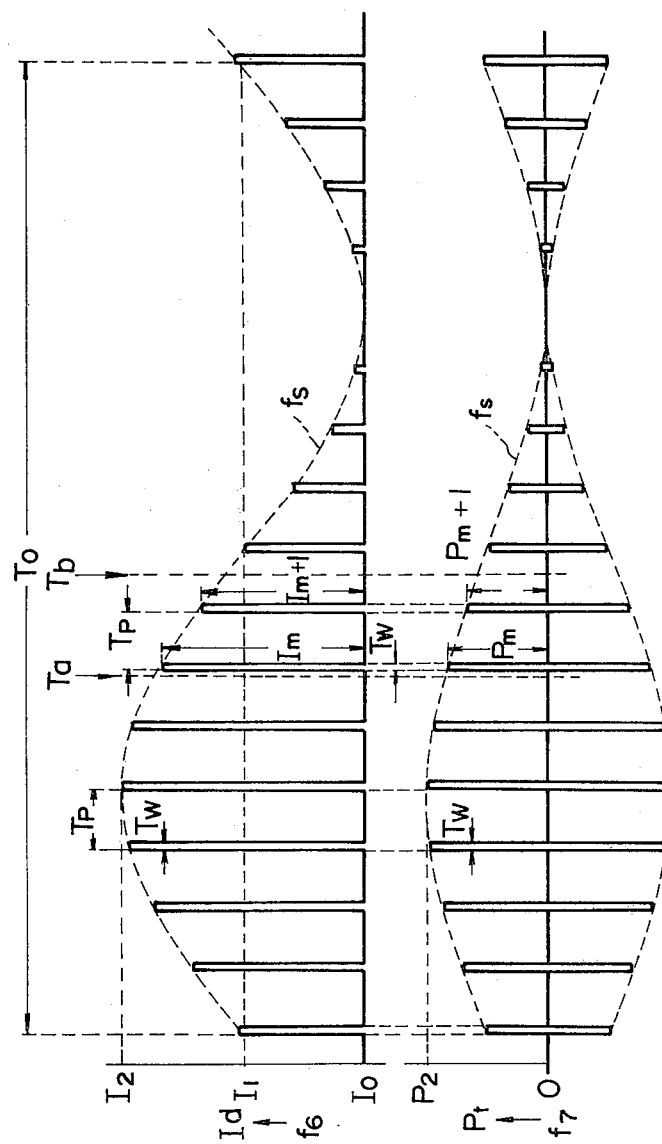

In FIG. 8 again and in FIGS. 16A, B and C, the current $I_d$ which is the output signal $f_6$ of the pulse amplitude modulator 20 is inputted to drive the light transmitter 123, thereby producing a pulse amplitude modulation signal $f_7$ which is represented by a pulse train signal having a pulse width $T_w$, a pulse repetition period $T_p$ and for which the envelope of the top points of the peak values of the pulse train signal is a sinusoidal signal having a frequency $f_0$. The pulse modulation signal $f_7$ is projected forward of the vehicle through the optical transmitting system 120a including the black box 121 and the transparent window 122. When an obstacle N is present, the light receiver 110 receives the light reflected by the obstacle N. The photoreceptor 110 is provided with the black box 111, the window 112 provided with the interference filter, and the receiving element 113.

As shown in FIG. 16B which enlarges the area between the times $T_a$ and $T_b$ in FIG. 16A, the receiving element 113 receives the reflected signal $f_8$ or $f_9$ of the signal $f_7$. The reflected signal $f_8$ is produced when the distance R from the forward end of the vehicle to the obstacle N does not exceed the distance $R_a$ which is the limit of the detection area $A_d$ ($R \leq R_a$, and the propagation delay time $t_{d2}$ is shorter than the pulse width $T_w$($t_{d2} \leq T_w$). In the respective cases, video pulse signals $f_{10}$ and $f_{11}$ having a value $U_d$ are obtained. The output of the receiving element 113 is inputted to the light detector 130.

Figure 17:
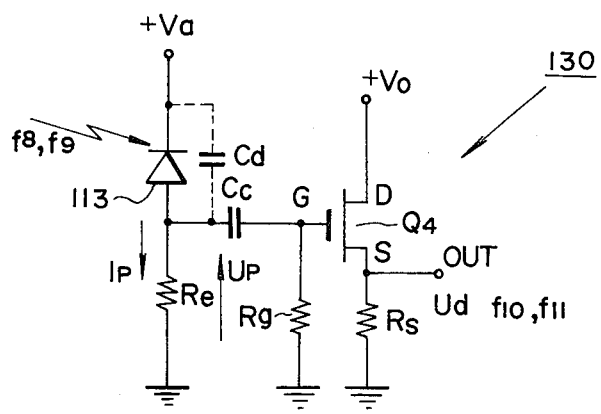
FIG. 17 is a circuit diagram of a light detector shown in FIG. 8.

In FIG. 17, the light detector 130 includes a receiving element 113 such as an avalanche photodiode or a PIN photodiode, and an field effect transistor (FET) $Q_4$ arranged as shown. Thus the received light signal $f_8$ or $f_9$ is photoelectrically converted into an electric current $I_p$. The pulse-formed signal $U_p (\cong I_p R_e)$ produced across a resistor load $R_e$ is applied to the gate G of FET $Q_4$ whose gate resistance $R_g$ is set so that $R_g >> R_e$, thereby producing a video pulse signal $f_{10}$ or $f_{11}$ having the value $U_d$ though the impedance conversion circuit including a source follower having a low output impedance $z_0$ which is given by $$Z_0 = gm^{-1} \parallel R_s \tag{20}$$

where gm is the mutual conductance of FET $Q_4$, and $\parallel$ shows a parallel connection.

$$U_d \cong U_p \cong I_p \cdot R_e \tag{21}$$

Figure 16C:
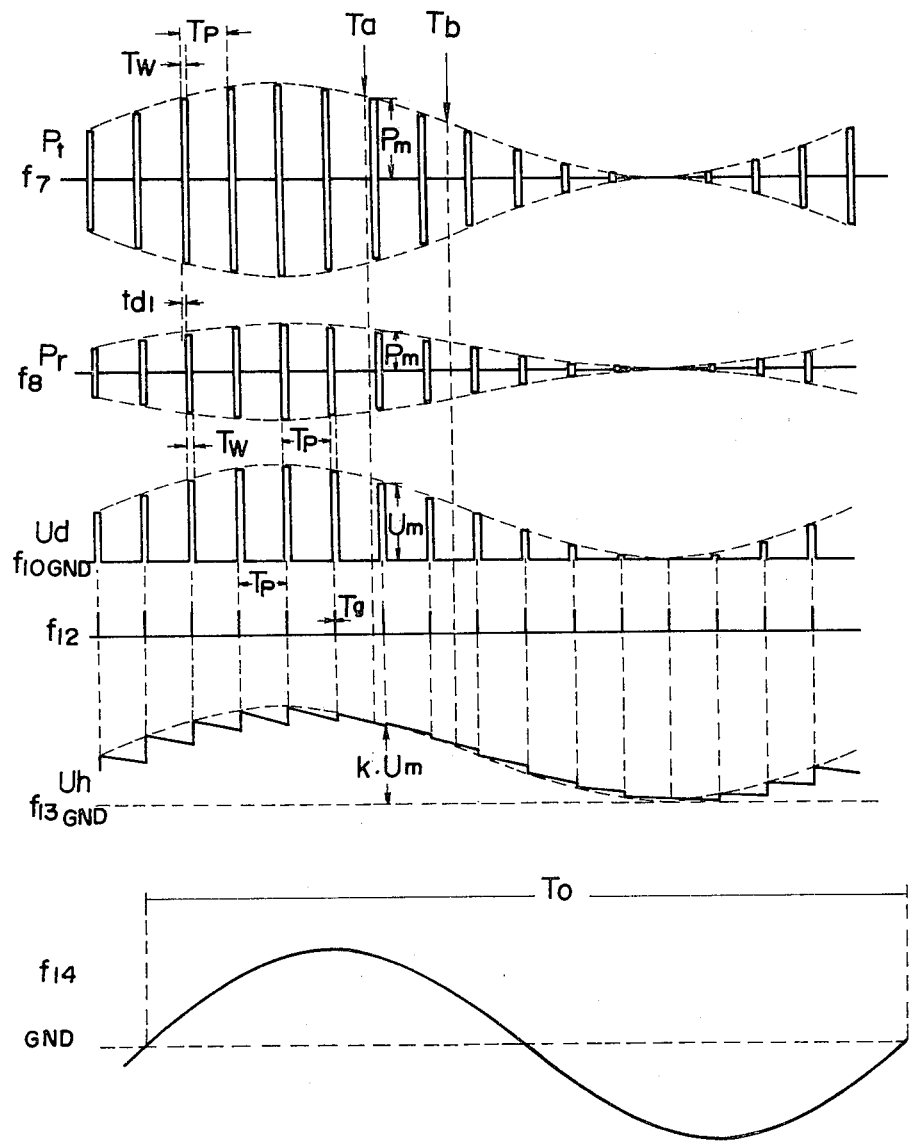

The requirements for response to the video pulse signal $f_{10}$ or $f_{11}$ are:

$$C_d \cdot R_e \leq 5 \text{ (ns)} \tag{22}$$

where $C_d$ is the capacitance between the terminals of the receiving element 113. The video pulse signal $f_{10}$ or $f_{11}$ having the value $U_d$ is amplified with a predetermined amplification factor by the wide band amplifier 132 having a band width of about 50 MHz, and this amplified signal is inputted to the sample and hold circuit 134 to which a gating pulse signal $f_{12}$ from the gating pulse generator 40 is applied. The gating pulse signal $f_{12}$ has a pulse width of $T_g$ ($\cong 10$ ns) and the trailing edge of the pulse is set to substantially coincide with the trailing edge of the pulse amplitude modulation light emitting power $P_t$ pulse. Depending upon the time relationship between the gating pulse signal $f_{12}$ and the video pulse signal $f_{10}$ or $f_{11}$, no video pulse signal $f_{11}$ is detected when $R > R_a$ whereas the video pulse signal $f_{10}$ is detected to produce a pulsating signal $f_{13}$ having an output value $U_h$ when $R \leq R_a$. In FIG. 16C, the received signal $f_s$ having the value $P_r$, the video pulse signal $f_{10}$, and the pulsating signal $f_{13}$ are shown for the case of $R \leq R_a$. The graphs shown in FIG. 16C have the same time scale as those shown in FIG. 16A. The received signal $f_8$ having the value $P_r$ and the video pulse signal $f_{10}$ having the value $U_d$ which is the detected output of the signal $f_8$ are pulse amplitude modulation signals of a pulse train which has a period $T_p$, a pulse width $T_w$, and the envelopes of the pulse peaks of the pulse train signals are sinusoidal signals of frequency $f_0$. The envelope of the pulsating signal $f_{13}$ having the output $U_h$ is inputted to the low-pass filter 136 having a high cutoff frequency $f_H$ which satisfies the conditions $$f_0 << f_H << T_p^{-1} \tag{23}$$

to remove the high frequency components from the pulsating signal $f_{13}$, which is thereby demodulated into a sinusoidal signal $f_{14}$ having a frequency $f_0$ which is sufficiently amplified by a narrow band amplifier 140 having a resonant $Q \cong 10$ so as to remove noise contained therein.

Figure 18:
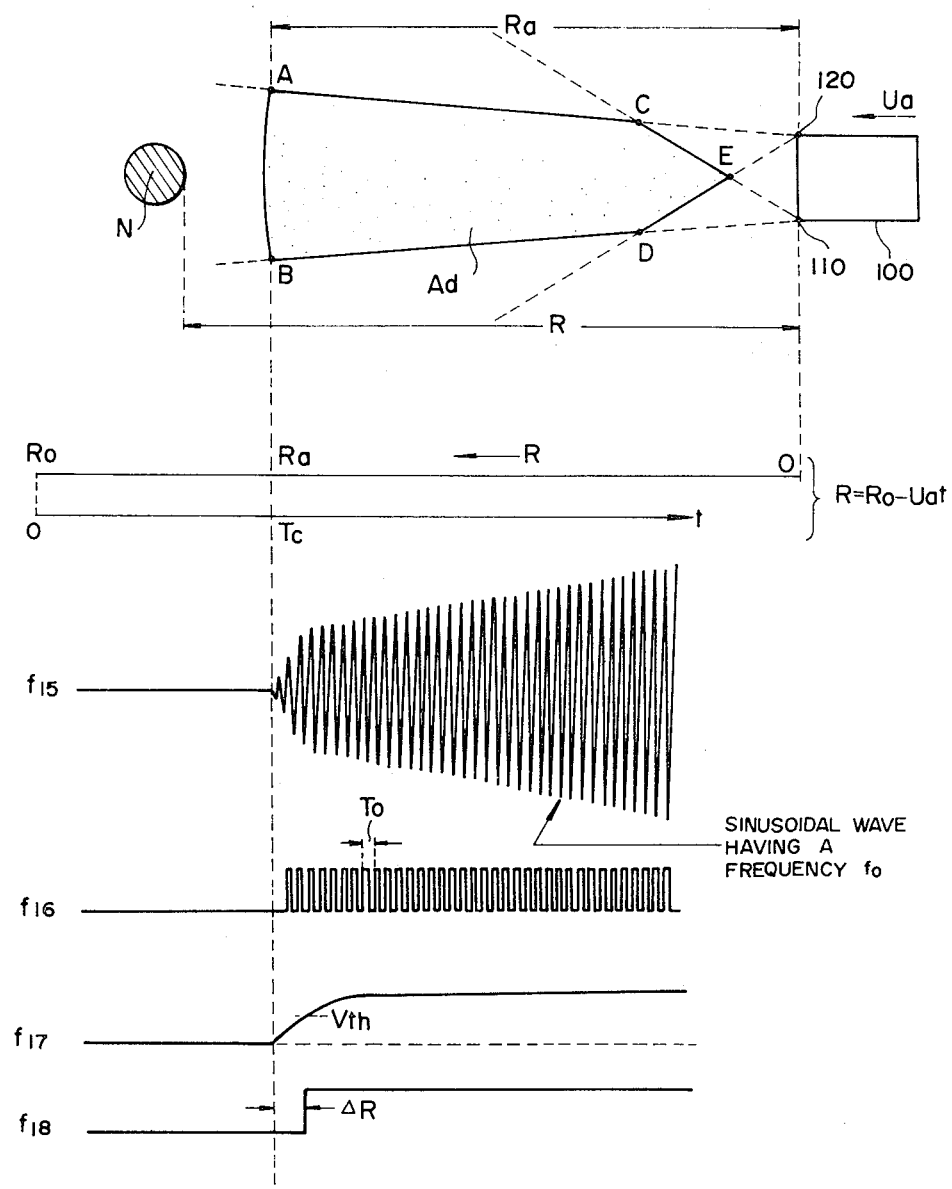
FIG. 18 is an illustration showing the relationship between an obstacle and the detection area and a corresponding timing chart for the detector according to the present invention.

In FIG. 18 is shown the relationship between the distance R from the vehicle 100 to the obstacle N (present in the direction the vehicle is traveling) and the detection area $A_d$ and underneath this are shown the signal waveforms at some particular points in the detector for different values of the distance R. The narrow band amplifier 140 does not output a sinusoidal signal $f_{15}$ with a frequency of $f_0$ until the distance R reaches $R_a$, i.e. until the distance R between the forward end of the vehicle and the obstacle N becomes not more than $R_a$, or the obstacle N comes within the detecting area $A_d$, in which case the amplitude of the signal $f_{15}$ increases first rapidly and then gradually under the influence of the light emitting power $P_t$ and the spherical diffusion of the reflected light, as the vehicle approaches the obstacle. The sinusoidal signal $f_{15}$ is shaped by the wave shaper 150 into a pulse train signal $f_{16}$ having a frequency $T_0 (= 1/f_0)$ which is inputted to the integrating circuit 160 of time constant $\tau >> T_0$ to obtain a smoothed signal $f_{17}$. This signal is compared with a threshold voltage level $V_{th}$ in the comparator 170 which produces a collision warning signal $f_{18}$ when the vehicle has come to a distance $R = R_a - \Delta R$ ($\Delta R$ is set to about 2.0 m) from the obstacle. Thus the driver's response lag time $T_d$(sec) in the expression (13) is preferably set to about 1.5 sec slightly longer than the actual value $0.7 \cong 1.0$ sec, in view of $\Delta R$. The collision warning signal $f_{18}$ drives a warning generator 180 such as a buzzer to generate a warning for avoiding collision. The signal 18 can be used to control the rotational speed of the engine to prevent collision with the obstacle.

Figure 19:
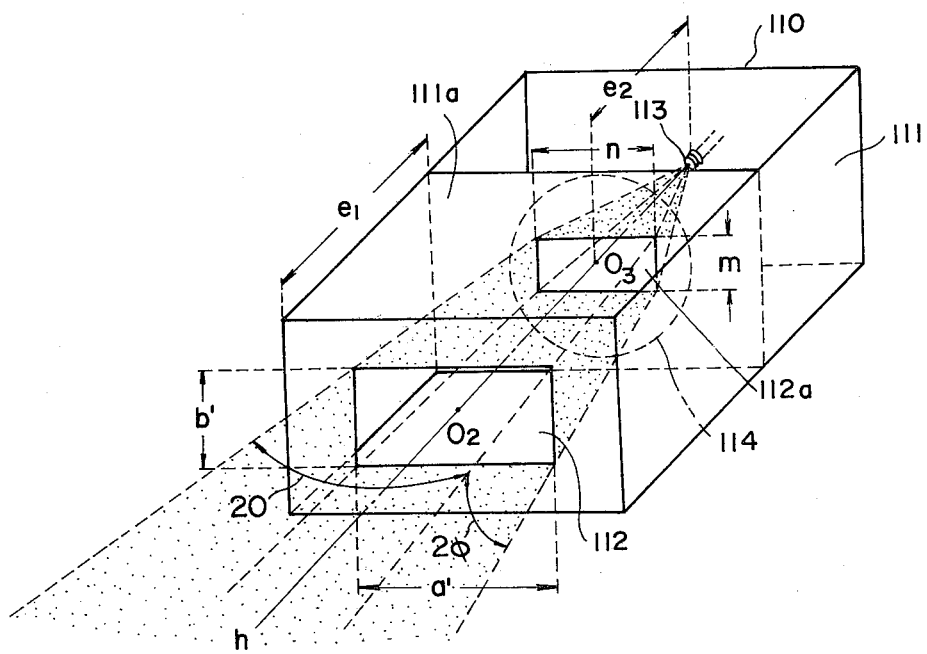
FIG. 19 is an illustration of another embodiment of the photoreceptor used in the present invention.

The sensitivity of detecting obstacles, i.e. of receiving light reflected by the obstacles, substantially depends on the output power $P_t$ of the light emitting element 123 and the receiving area of the photoreceptor 110 (the tip area of the receiving element 113 in FIG. 4). In FIG. 19, there is shown a structure which has a relatively large receiving area for improving the detecting sensitivity. The photoreceptor 110 includes a black box 111 which is provided with a window 112 on a front wall thereof, the window having an interference filter fitted therein whose size is expressed by $a' \times b'$ and whose center is expressed by $O_2'$, and another window 112a having an area $S_r$ whose size is $m \times n$ and whose center is $O_3$ and in which a convex lens 114 having a focal distance f is fitted provided on an intermediate partition 111a. The distance $e_2$ between the light receiving element 113 and the window 112a is set to about f which is the focal length of the convex lens 114 so that the light entering the window 112a and reflected by the obstacle N is focused by the convex lens 114 onto the receiving element 113. That is, the receiving area of the photoreceptor 110 is increased by the action of the convex lens 114 from the receiving area ($\cong 1$ mm$^2$) to $S_r = m \times n$ mm$^2$.

The front window 112 and the window 112a are required to form a received light beam $B_r$ such as in FIG. 4. Thus, the following relationship must hold between the dimensions $a'$ and $b'$ of the window 112 and the dimensions m and n of the window 112a:

$$\tan \theta = \frac{a' - n}{2 e_1} \quad (24)$$

$$\tan \phi = \frac{b' - m}{2 e_1}$$

where $\theta$ is half of the horizontal angular range $2\theta$, $\phi$ is half of the vertical angular range $2\theta$, $a' > n > a$, $b' > m > b$, and a and b are the dimensions of the window 112 in FIG. 4 and $e_1$ is the distance between the front wall and the intermediate wall 111a.

In the above embodiment, the light transmitter 120 and the photoreceptor 110 are shown as being mounted on the front end of the vehicle 100 to prevent the vehicle from colliding with an obstacle. Another light transmitter and photoreceptor pair similar to the transmitter 120 and photoreceptor 110 may be provided on the rear end of the vehicle to detect an obstacle behind the vehicle when the vehicle is moving backward.

The preferred embodiment of the present invention has been described and shown. However, the present invention should not be limited to this particular embodiment. Those skilled in the art could make various modifications and variations without departing from the spirit and the scope of the present invention.

What is claimed is:

1. An obstacle detector for a vehicle comprising:
   means for producing a first pulse signal having pulse with a width substantially equal to twice the travel time required for light to travel a braking distance;
   means responsive to the first pulse signal for transmitting a light signal of duration substantially equal to the pulse width of the first pulse signal so as to cover a detection area which extends to include the braking distance away from the vehicle;
   means for receiving a light signal reflected by an obstacle present in the detection area and for converting the received light signal to a second corresponding electric pulse signal;
   means for determining whether the time width of a pulse of the first signal is larger than the time interval taken from the time when the light signal is transmitted to the time when the light signal is received by said receiving means after reflection by the obstacle; and
   said first pulse signal producing means including means for generating a clock signal, means for generating a ramp function starting each time a pulse of the clock signal is inputted thereto, means for creating the sum of a braking distance signal and a signal indicative of the distance which the vehicle travels during the driver's response time, depending on the vehicle speed, and means for defining the width of a pulse of the first signal as the time interval from the time when each ramp function starts to the time when the value of the ramp function exceeds the sum.

2. An obstacle detector according to claim 1, wherein said determining means compares the end of the pulse of the first signal with the beginning of the pulse of the second signal and determines that an obstacle exists within the detection area when the beginning of the pulse of the second signal precedes the end of the pulse of the first signal.

3. The obstacle detector according to claim 1, wherein said determining means includes means for outputting a gating pulse in the vicinity of the trailing edge of a pulse of the first pulse signal from said producing means, means responsive to the gating pulse for sampling the output of said receiving means, means for integrating the output of said sampling means, and means for comparing a predetermined reference value with the output of said integrating means.

4. The obstacle detector according to claim 1, further including means for producing a modulation signal with a frequency lower than that of the first signal and means provided between said first pulse signal producing means and said transmitting means for modulating the amplitude of the first pulse signal with the modulating signal from said modulation signal producing means.

5. The obstacle detector according to claim 4, wherein said determining means further includes a low pass filter provided between said sampling means and said integrating means.

6. The obstacle detector according to claim 4, wherein said modulating means includes a pair of first and second transistors connected in parallel, the first transistor being normally conductive and the second transistor being normally nonconductive, the second transistor receiving at its base electrode the first signal from said first pulse signal producing means thereby being rendered conductive and turning off said first transistor, and a third transistor connected in series with said pair of first and second transistors for receiving at its base electrode the modulation signal from said modulation signal producing means to cause an electric current proportional to the output of said first pulse signal producing means to flow between the collector and emitter of the third transistor.

7. The obstacle detector according to claim 6, wherein said transmitting means includes a light emitting element connected in series with said second transistor.

8. The obstacle detector according to claim 7, wherein said receiving means includes a photoelectric element and a resistor connected in series therewith, a field effect transistor, a capacitor coupling the junction between the photoelectric element and the resistor to the gate electrode of said field effect transistor, and a second resistor connected between the source electrode of said field effect transistor and ground to produce an output from the source of said field effect transistor.

9. The obstacle detector according to claim 1, wherein said braking distance is calculated using the expression $(U_a^2/2\delta)+U_a \cdot T_d$ where $U_a$ is the vehicle speed, $\delta$ is the maximum deceleration during the braking, and $T_d$ is a driver response time lag.

10. The obstacle detector according to claim 1, wherein said transmitting means includes a box having an opening in a front wall thereof and a light emitting element in an inner rear wall thereof whereby light emitted from said light emitting element is radiated outward through said opening.

11. The obstacle detector according to claim 1, wherein said receiving means includes a box having an opening in a front wall thereof and a photoelectric element in an inner rear wall thereof whereby light entering the opening is received by said photoelectric element.

12. The obstacle detector according to claim 1, wherein said receiving means includes a box having an opening in a front wall thereof, a light receiving photoelectric element in an inner rear wall thereof, and a partition provided between said front and rear walls, said partition being provided with a convex lens for focusing the light which enters the opening onto said photoelectric element.

* * * * *